US012767035B2

(12) United States Patent
McCabe et al.

(10) Patent No.: US 12,767,035 B2
(45) Date of Patent: Oct. 20, 2026

(54) WINDING ASSEMBLY WITH MESH DRIVE LINKAGE

(71) Applicant: LOADHOG LIMITED, Sheffield (GB)

(72) Inventors: Allan McCabe, Sheffield (GB); Martin Baker, Sheffield (GB)

(73) Assignee: LOADHOG LIMITED, Sheffield (GB)

(*) Notice: Subject to any disclaimer, the term of this patent is extended or adjusted under 35 U.S.C. 154(b) by 127 days.

(21) Appl. No.: 18/723,101

(22) PCT Filed: Dec. 22, 2022

(86) PCT No.: PCT/IB2022/062659
§ 371 (c)(1),
(2) Date: Jun. 21, 2024

(87) PCT Pub. No.: WO2023/119211
PCT Pub. Date: Jun. 29, 2023

(65) Prior Publication Data

US 2025/0100769 A1 Mar. 27, 2025

(30) Foreign Application Priority Data

Dec. 23, 2021 (GB) ..................................... 2118868
Dec. 23, 2021 (GB) ..................................... 2118869
(Continued)

(51) Int. Cl.
*B65D 71/00* (2006.01)
*B60P 7/08* (2006.01)
(Continued)

(52) U.S. Cl.
CPC ............. *B60P 7/0823* (2013.01); *B60P 7/083* (2013.01); *B60P 7/0838* (2013.01);
(Continued)

(58) Field of Classification Search
CPC ........... B60P 7/00; B60P 7/0823; B60P 7/083; B60P 7/0838; B60P 7/0846; B60P 7/0853;
(Continued)

(56) References Cited

U.S. PATENT DOCUMENTS 5,295,664 A * 3/1994 Kamper .................. B60P 7/083
254/342
6,102,371 A * 8/2000 Wyers ................... B60P 7/0846
254/218
(Continued)

FOREIGN PATENT DOCUMENTS

CN 110977858 A * 4/2020 .............. B60P 3/075
DE 60210469 T2 * 11/2006 .............. B60P 7/083
(Continued)

*Primary Examiner* — Faris S Almatrahi
*Assistant Examiner* — Raveen J Dias
(74) *Attorney, Agent, or Firm* — Clark Hill PLC; James R. Foley

(57) ABSTRACT

Embodiments relate to a winding assembly (16) comprising: a tensioner (37) to which a tensioning line (10) is engageable; an interface (19, 19B) configured to receive actuation force; and a drive linkage (18, 18A, 18B, 42, 42A, 42B) coupling actuation of the interface (19, 19B) to motion of the tensioner.

17 Claims, 7 Drawing Sheets

(30) Foreign Application Priority Data

May 30, 2022 (GB) .................................... 2207960
Dec. 21, 2022 (GB) .................................... 2219325

(51) Int. Cl.
*B60P 7/10* (2006.01)
*B65H 75/40* (2006.01)
*B65H 75/42* (2006.01)
*B65H 75/44* (2006.01)

(52) U.S. Cl.
CPC ........ *B60P 7/0846* (2013.01); *B65D 71/0088* (2013.01); *B65H 75/406* (2013.01); *B65H 75/4428* (2013.01); *B65H 75/4431* (2013.01); *B65H 75/4492* (2013.01); *B65H 75/4494* (2013.01); *B60P 7/10* (2013.01); *B65D 2571/00055* (2013.01); *B65D 2571/00111* (2013.01); *B65H 75/42* (2013.01); *B65H 2403/41* (2013.01); *B65H 2403/42* (2013.01); *B65H 2403/48* (2013.01); *B65H 2701/375* (2013.01)

(58) Field of Classification Search
CPC ........... B60P 7/10; B65H 75/10; B65H 75/30; B65H 75/38; B65H 75/40; B65H 75/406; B65H 75/42; B65H 75/425; B65H 75/4428; B65H 75/4431; B65H 75/4457; B65H 75/4476; B65H 75/4481; B65H 75/4492; B65H 75/4493; B65H 75/48; B65H 54/585; B65H 2403/40; B65H 2403/41; B65H 2403/4111; B65H 2403/412; B65H 2403/42; B65H 2403/43; B65H 2403/45; B65H 2403/46; B65H 2403/48; B65H 2403/483; B65H 2403/484; B65H 2403/50; B65H 2701/375; B65H 75/4494; B65H 2403/411; B66D 71/02; B66D 71/0088; B66D 71/0892; B66D 71/0896; B66D 2571/00; B66D 2571/00055; B66D 2571/00111
USPC .................. 242/362, 378.4, 385.4, 395, 397; 24/68 CD, 68 R, 69 ST, 69 TM, 70 ST; 254/219, 220, 229, 241, 296, 342, 343, 254/344, 345; 206/597; 410/400
See application file for complete search history.

(56) References Cited

U.S. PATENT DOCUMENTS

| | | | | |
|---|---|---|---|---|
| 6,481,692 | B1 * | 11/2002 | King | B60P 7/0853 254/223 |
| 7,216,849 | B2 * | 5/2007 | Tremblay | B66D 1/16 24/69 ST |
| 7,311,484 | B2 * | 12/2007 | Facey | B65D 71/0096 410/100 |
| 7,476,069 | B2 * | 1/2009 | Facey | B60P 7/083 410/100 |
| 8,434,979 | B1 | 5/2013 | Genge | |
| 8,651,509 | B1 * | 2/2014 | Huang | B60D 1/185 280/480.1 |
| 9,061,622 | B2 * | 6/2015 | Knox | B60P 7/083 |
| 9,227,550 | B2 * | 1/2016 | Chen | B60P 7/083 |
| 9,561,838 | B1 * | 2/2017 | Byers | F16G 11/12 |
| 9,796,323 | B1 * | 10/2017 | Anderson | B60P 7/083 |
| 9,862,300 | B1 * | 1/2018 | Anderson | B60P 7/0846 |
| 10,000,148 | B1 * | 6/2018 | Haynes | B65H 54/585 |
| 10,266,099 | B2 * | 4/2019 | Chen | B60P 7/083 |
| 10,710,840 | B1 * | 7/2020 | Williams | B65H 75/425 |
| 11,820,277 | B2 * | 11/2023 | Chou | B60P 7/083 |
| 12,157,410 | B2 * | 12/2024 | Baker | B65D 71/0096 |
| 12,234,132 | B2 * | 2/2025 | Massicotte | B66D 3/006 |
| 12,241,523 | B2 * | 3/2025 | Helline | F16G 11/12 |
| 2003/0145434 | A1 * | 8/2003 | Lin | B60P 7/0823 24/68 CD |
| 2004/0084558 | A1 * | 5/2004 | Huang | B65H 54/585 242/385.4 |
| 2004/0094650 | A1 * | 5/2004 | Huang | B65H 75/48 242/385.4 |
| 2004/0155230 | A1 * | 8/2004 | Fortin | B60P 7/083 254/222 |
| 2005/0260055 | A1 * | 11/2005 | Facey | B65D 71/0096 410/46 |
| 2006/0180800 | A1 * | 8/2006 | Tremblay | B66D 1/16 254/219 |
| 2007/0056146 | A1 * | 3/2007 | Madachy | B60P 7/0846 24/68 CD |
| 2008/0014037 | A1 * | 1/2008 | Facey | B60P 7/083 410/35 |
| 2010/0166520 | A1 * | 7/2010 | Ruan | B60P 7/083 410/156 |
| 2010/0166521 | A1 * | 7/2010 | Ruan | B60P 7/083 410/103 |
| 2010/0284757 | A1 * | 11/2010 | Numata | B60P 7/0823 410/103 |
| 2010/0295004 | A1 * | 11/2010 | Huang | B60P 7/0846 254/218 |
| 2011/0158761 | A1 * | 6/2011 | Jackson | B65D 21/064 410/96 |
| 2011/0233493 | A1 * | 9/2011 | Huang | B60P 7/0846 24/69 ST |
| 2012/0110801 | A1 * | 5/2012 | Joubert | B60P 7/0846 24/68 CD |
| 2012/0227223 | A1 * | 9/2012 | Knox | B60P 7/083 24/68 CD |
| 2012/0241545 | A1 * | 9/2012 | Borntrager | B65H 75/40 242/395 |
| 2013/0247340 | A1 * | 9/2013 | Chen | B62J 7/08 24/69 ST |
| 2014/0061556 | A1 | 3/2014 | Knox | |
| 2014/0109361 | A1 * | 4/2014 | Helline | B60P 7/083 24/68 CD |
| 2014/0246533 | A1 * | 9/2014 | Huang | B60P 7/0846 242/379 |
| 2015/0040359 | A1 * | 2/2015 | Brown | B60P 7/083 24/68 CD |
| 2015/0151664 | A1 * | 6/2015 | Chang | B60P 7/083 24/70 CT |
| 2015/0352997 | A1 * | 12/2015 | Huang | B65H 16/005 242/407 |
| 2016/0318436 | A1 * | 11/2016 | Niu | F16H 57/12 |
| 2018/0290582 | A1 * | 10/2018 | Chou | B60P 7/0853 |
| 2018/0326893 | A1 | 11/2018 | Chen et al. | |
| 2019/0186595 | A1 * | 6/2019 | Agarwalla | F16G 3/006 |
| 2020/0062165 | A1 * | 2/2020 | Wang | F16G 11/12 |
| 2020/0164786 | A1 * | 5/2020 | Ruan | F16G 11/12 |
| 2020/0254919 | A1 * | 8/2020 | Helline | B25B 13/06 |
| 2020/0284319 | A1 * | 9/2020 | D'Antonio | F16G 11/12 |
| 2021/0016702 | A1 * | 1/2021 | Huang | B60P 7/0853 |
| 2021/0101518 | A1 * | 4/2021 | Helline | F16G 11/12 |
| 2021/0170937 | A1 * | 6/2021 | Chen | B60P 7/083 |
| 2021/0237639 | A1 * | 8/2021 | Zhu | B60P 7/0846 |
| 2022/0009755 | A1 * | 1/2022 | Forney | B66D 1/06 |
| 2022/0097594 | A1 * | 3/2022 | Wiebe | F16G 11/12 |
| 2022/0111783 | A1 * | 4/2022 | Zhou | B60P 7/0846 |
| 2022/0161708 | A1 * | 5/2022 | Chou | B60P 7/083 |
| 2022/0212906 | A1 * | 7/2022 | Massicotte | B66D 1/04 |
| 2023/0025300 | A1 * | 1/2023 | King | B60R 22/34 |
| 2024/0025330 | A1 * | 1/2024 | Baker | B60P 7/083 |
| 2024/0131979 | A1 * | 4/2024 | Helline | B60P 7/083 |
| 2024/0239553 | A1 * | 7/2024 | Davis | B65D 63/10 |
| 2025/0058696 | A1 * | 2/2025 | McCabe | B60P 7/0838 |
| 2025/0083918 | A1 * | 3/2025 | Chou | B65H 75/4481 |

FOREIGN PATENT DOCUMENTS

| | | |
|---|---|---|
| GB | 2128574 A | 5/1984 |
| GB | 2455290 A | 6/2009 |

(56) References Cited

FOREIGN PATENT DOCUMENTS

| | | | | |
|---|---|---|---|---|
| WO | WO-8908603 A1 * | 9/1989 | ........... | A44B 11/125 |
| WO | 2007/100315 A2 | 9/2007 | | |
| WO | 2011/20249 A1 | 2/2011 | | |
| WO | 2021/090253 A1 | 5/2021 | | |

* cited by examiner

WINDING ASSEMBLY WITH MESH DRIVE LINKAGE

RELATED/PRIORITY APPLICATION

This application is a National Phase filing regarding International Application No. PCT/IB2022/062659, filed on Dec. 22, 2022, which relies upon Great Britain Application No. 2118868.5, filed on Dec. 23, 2021, Great Britain Application No 2118869.3, filed on Dec. 23, 2021, Great Britain Application No. 2207960.2, filed on May 30, 2022, and Great Britain Application No. 2219325.4, filed on Dec. 21, 2022, for priority.

FIELD OF THE INVENTION

Embodiments of the present invention relate to a winding assembly with a mesh drive linkage. In particular, the winding assembly is a pallet lid winding assembly with a mesh drive linkage.

BACKGROUND TO THE INVENTION

It is known to load goods on pallets. Lids can be mounted on the loads. Such lids are provided with straps to tighten the lid against the load when the ends of the straps as secured to the pallet. The lids include tightening mechanisms, operated by levers, to tighten the strap, thereby pulling the lid against the load. In some situations, using the tightening mechanisms by operating the levers can be time consuming. For example, the lever may need to be turned many times to ratchet the straps tight.

BRIEF DESCRIPTION OF VARIOUS EMBODIMENTS OF THE INVENTION

According to various, but not necessarily all, embodiments of the invention there is provided a winding assembly comprising:

- a tensioner to which a tensioning line (e.g., strap, wire or the like) is engageable;
- an interface configured to receive actuation force; and
- a drive linkage coupling actuation of the interface to motion of the tensioner, wherein the drive linkage is a mesh drive linkage.

An advantage of the use of a meshing drive linkage is the prevention of slippage in the drive linkage and more precise control of the tensioner. The total mechanical work done by the interface is consistent and predictable, resulting in a predictable amount of tension so that the tensioning line is neither too tight nor too loose. The user no longer has to judge the correct amount of tension.

The mesh drive linkage of the winding assembly may comprise a driver actuatable by the lever, and the tensioner may comprise a drive input directly or indirectly coupled to the driver via meshing, and actuated by the driver.

The driver and/or the tensioner drive input may be a mesh drive such as a sprocket or a gear. The sprocket(s) may connect to a perforated or indented drive loop such as a ribbed belt or chain. The ribbed belt may comprise transverse ribs.

Alternatively, the driver and/or the tensioner drive input comprises a gear, for example, the driver gear may mesh directly with the tensioner drive input gear.

The driver gear may comprise a worm drive and the tensioner drive input gear may comprise a worm wheel. The worm drive and worm wheel may directly mesh.

Alternatively, the driver gear may comprise a bevel gear and the tensioner drive input gear may comprise a bevel gear. The bevel gears may directly mesh.

In some examples, the mesh drive linkage can be driven in reverse to release the tensioner. Alternatively, if the mesh drive linkage comprises gears, the driver gear and/or the tensioner drive input gear may be movable out of meshing with each other to release the tensioner. The driver gear may slide perpendicular to its axis of rotation and/or the tensioner drive input gear may slide perpendicular to its axis of rotation. The winding assembly may comprise a tactile user control, such as a button, connected to a slider or other mechanism to cause the de-meshing.

The mesh drive linkage may provide an interface: tensioner gear ratio of greater than 5:1 or greater than 10:1 or greater than 15:1. The angular distance from a home position of the tensioner to a tensioning position of the tensioner may be a reflex angle, such as approximately 300 degrees. In an example implementation, 18 turns of the interface turns the tensioner by the required reflex angle.

The interface may be rotatable about an input axis of rotation extending through the fulcrum body. The input axis may be an upwards axis such as a vertical axis. Therefore, the interface may rotate laterally.

An advantage of the direction change is that the winding assembly has a low vertical height, because the interface rotates laterally. Therefore, the winding assembly is suitable for use as a pallet lid winding assembly.

The tensioner may be rotatable about a tensioner axis of rotation different from the input axis of rotation. The tensioner axis may be a lateral axis. The tensioner axis may be perpendicular to the input axis. The mesh drive linkage of the winding assembly may connect the input axis of rotation to the tensioner axis of rotation. For example, if a drive loop (e.g., belt) is used, the drive loop may be twisted. For example, the drive loop may comprise a quarter-twist. If a gear drive linkage is used instead, the driver may be a bevel gear or worm drive to change the direction of rotation.

The interface may comprise a recess configured to receive a tool, which may be a drive key. The recess may be a polygonal recess. The drive key may be a polygonal drive key, having a polygonal end profile. The tool may be an electric tool capable of rotating the drive key. The recess may be a hexagonal recess or another suitable shape, such as star-shaped. The drive key may be a hex drive key, a star shaped drive key, or any other suitable drive key.

An advantage is enabling full or partial automation of tensioning.

If the interface is a recess for receiving a drive key, over-tensioning may be prevented by providing the tensioner or the mesh drive linkage with an end stop. The end stop may collide with a portion of the winding assembly when the tensioner reaches its tensioning position, preventing further tensioning.

Instead of a recess, or in addition to a recess, the interface may comprise a lever. The lever may comprise a fulcrum body and an elongate handle extending from the fulcrum body. A lever is suitable for hand actuation.

If the interface is a lever, over-tensioning may be prevented by providing the winding assembly with a handle retainer configured to engage with the elongate handle of the lever following actuation of the lever in a first, tensioning direction, to prevent movement of the elongate handle of the lever in a second, opposite direction.

The lever has a stroke length associated therewith, wherein actuation of the lever by a single stroke length in a tensioning direction may actuate the tensioner from a home position of the tensioner to a tensioning position of the tensioner. When the elongate handle of the lever is engaged with the handle retainer the at the end of the single tensioning stroke, the tensioner is at the tensioning position.

An advantage is that the user is not able to over-tension or otherwise misuse the winding assembly. This is because the handle retainer and/or single-stroke operation provide clear feedback that the user has done all that needs to be done, to tension the tensioning line.

The handle retainer may comprise a catch to automatically (i.e., without user intervention) engage and hold the elongate handle of the lever when the elongate handle of the lever is actuated into the catch. For example, the handle retainer may comprise a snap fit catch.

An advantage of the catch-type handle retainer is further feedback that the user has done what needs to be done to tension the tensioning line, without the user needing to remember to manually engage the handle retainer. It would be understood that a manual latch could be used instead.

Alternatively, the handle retainer is replaced with a downstream retainer, configured to engage following actuation of the lever in the first, tensioning direction, to prevent movement of the lever in the second, opposite direction, wherein if the retainer is a handle retainer the engagement is with the elongate handle of the lever, and wherein if the retainer is a downstream retainer the engagement is downstream of the elongate handle of the lever.

The mesh drive linkage may comprise injection moulded parts. They may be injection moulded plastics. The injection moulding may also form the recess (e.g., hex key recess) in one of the mesh drive linkage parts. In an example implementation, the driver gear comprises a worm drive, an end of the worm drive comprising the interface such as the recess. An advantage is optimisation for manufacture.

The mesh drive linkage may comprise drop-in parts. The winding assembly may comprise a drop-in cavity arrangement sized to support one or more of the parts in an operational orientation when the parts are lowered in to the drop-in cavity arrangement during manufacture.

The whole tensioner (including its tensioner drive input) may be a drop-in part. The drop-in cavity arrangement may comprise bearings and a tensioner-receiving channel therebetween, onto which the tensioner can be lowered. The drop-in cavity arrangement may comprise a cylindrical recess into which a worm drive can be lowered.

The tensioner may be configured to receive the tensioning line therethrough. The tensioner may be rotatable by the interface via the mesh drive linkage. The rotation of the tensioner may wind the tensioning line around the tensioner. In an example, the tensioner may be slotted, to receive the tensioning line therethrough. The tensioner may be a slotted spindle. The tensioning line may comprise a strap.

The winding assembly may comprise a drum axle configured to receive a drum from which the tensioning line can be unwound and to which the tensioning line can be wound. The drum axle may comprise an urger, such as a spiral spring, to bias a drum fitted to the drum axle in a winding direction. The urger may bias the tensioner from a tensioning position of the tensioner towards a home position of the tensioner. Unintended back-rotation is prevented by the handle retainer if the interface comprises a lever, or if the interface comprises a recess, is prevented by a combination of friction and the high gear reduction of the mesh drive linkage.

According to various, but not necessarily all, embodiments of the invention there is provided a winding assembly comprising:

- a tensioner to which a tensioning line (e.g., strap, wire or the like) is engageable;
- an interface configured to receive actuation force, wherein the interface comprises a lever, wherein the lever has a stroke length associated therewith, wherein actuation of the lever by a single stroke length in a tensioning direction actuates the tensioner from a home position of the tensioner to a tensioning position of the tensioner; and
- a drive linkage coupling actuation of the interface to motion of the tensioner, wherein the drive linkage is a winding mechanism.

An advantage of the winding mechanism is the prevention of slippage, similar to the mesh drive linkage. The prevention of slippage advantageously ensures that the single stroke of the lever consistently results the required amount of tension.

The drive linkage may comprise a lever-actuatable driver. The tensioner may comprise a tensioner drive input coupled to the driver by a transmission line such as a cable.

An angular distance from a home position of the tensioner to a tensioning position of the tensioner may be a reflex angle, such as approximately 300 degrees.

The interface may be rotatable about an input axis of rotation extending through a fulcrum body. The input axis may be an upwards axis. The tensioner may be rotatable about a tensioner axis of rotation different from the input axis of rotation. The tensioner axis of rotation may be a lateral axis.

The lever may comprise a fulcrum body and an elongate handle extending from the fulcrum body. The lever may be suitable for hand actuation.

The winding assembly may comprise a retainer configured to be engaged following actuation of the lever in a first, tensioning direction, to prevent movement of the lever in a second, opposite direction, wherein the retainer is in the form of a handle retainer or downstream retainer, configured to engage following actuation of the lever in the first, tensioning direction, to prevent movement of the lever in the second, opposite direction, wherein if the retainer is a handle retainer the engagement is with the elongate handle of the lever, and wherein if the retainer is a downstream retainer the engagement is downstream of the elongate handle of the lever.

The drive linkage may comprise injection moulded parts and/or drop-in parts.

The tensioner may be configured to receive the tensioning line therethrough. The tensioner may be rotatable by the interface via the mesh drive linkage. The rotation of the tensioner may wind the tensioning line around the tensioner. The tensioner may comprise a slotted spindle. The tensioning line may comprise a strap.

The winding assembly may comprise a drum axle configured to receive a drum from which the tensioning line can be unwound and to which the tensioning line can be wound. The drum axle may comprise an urger to bias the drum fitted to the drum axle in a winding direction.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 1:
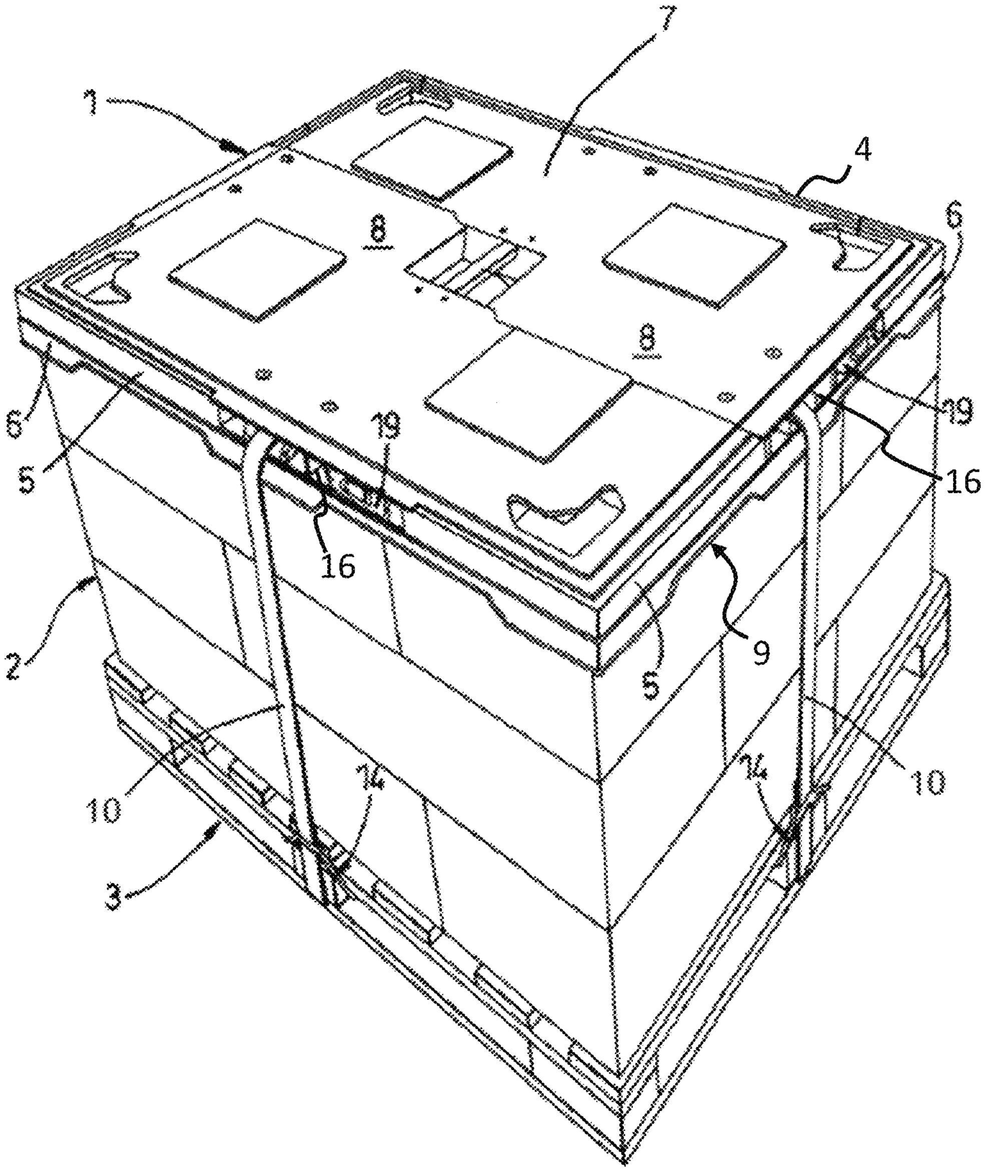
FIG. 1 is a perspective view of a lid in use on a load.

FIG. 1 shows a lid 1 for securing a load 2 on a pallet 3. The lid 1 comprises a body 4 with upstanding sides 5 and depending skirt 6 for capping the top sides of the load 2 (and also enabling a plurality of the lids 1 to be nested with each other or with pallets).

The body 4 comprises an upper portion 7 shown formed by a plurality of plastics mouldings 8, but which could be formed as a single moulding. The body 4 further includes a lower portion 9 formed by a main plastics moulding.

The lid 1 includes four tensioning lines in the form of straps 10. Each tensioning line 10 is movable between a retracted condition within the upper portion 7, and an extended condition in which the tensioning line 10 extends from the upper portion 7. Each tensioning line 10 is provided at a respective side of the lid 1.

Figure 2:
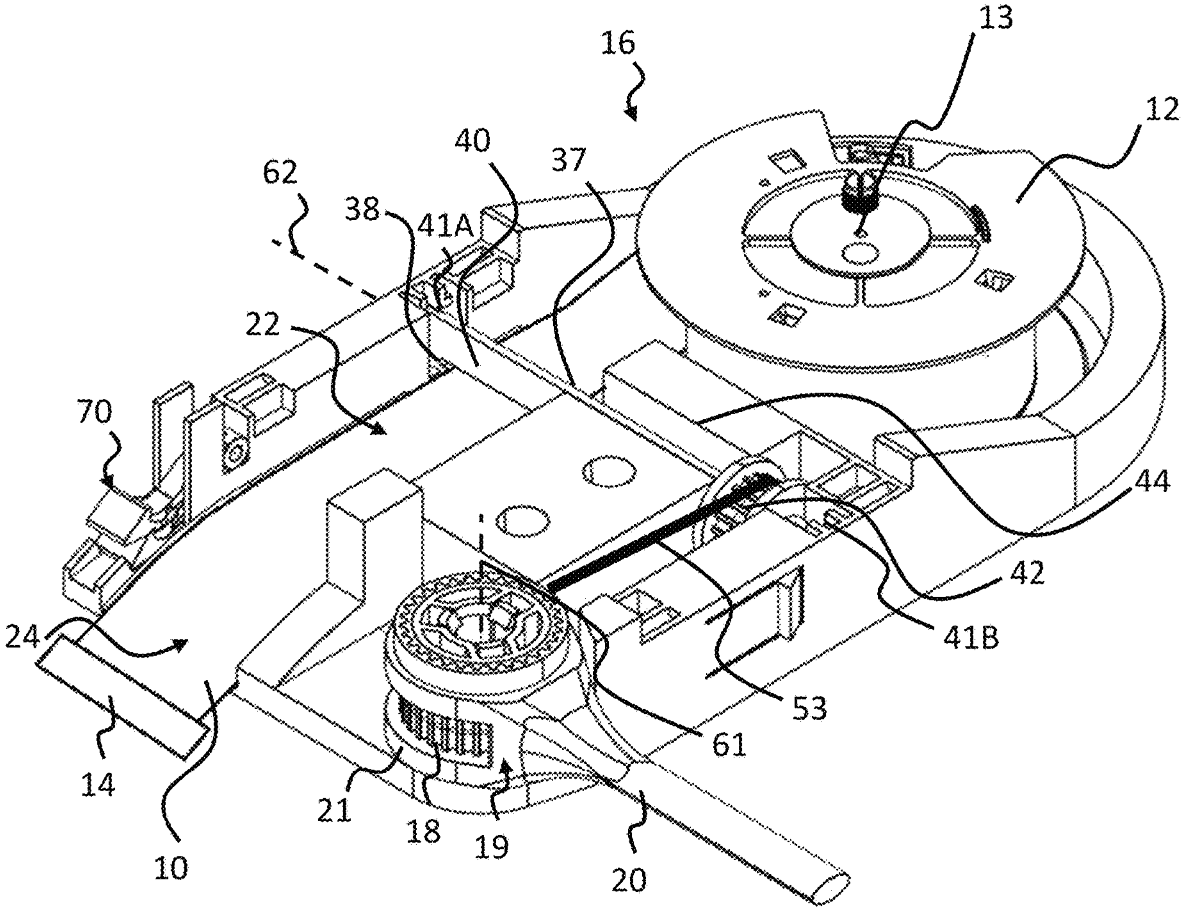
FIG. 2 is a perspective view of a winding assembly for use in the lid shown in FIG. 1, before a strap is tensioned.
Figure 3:
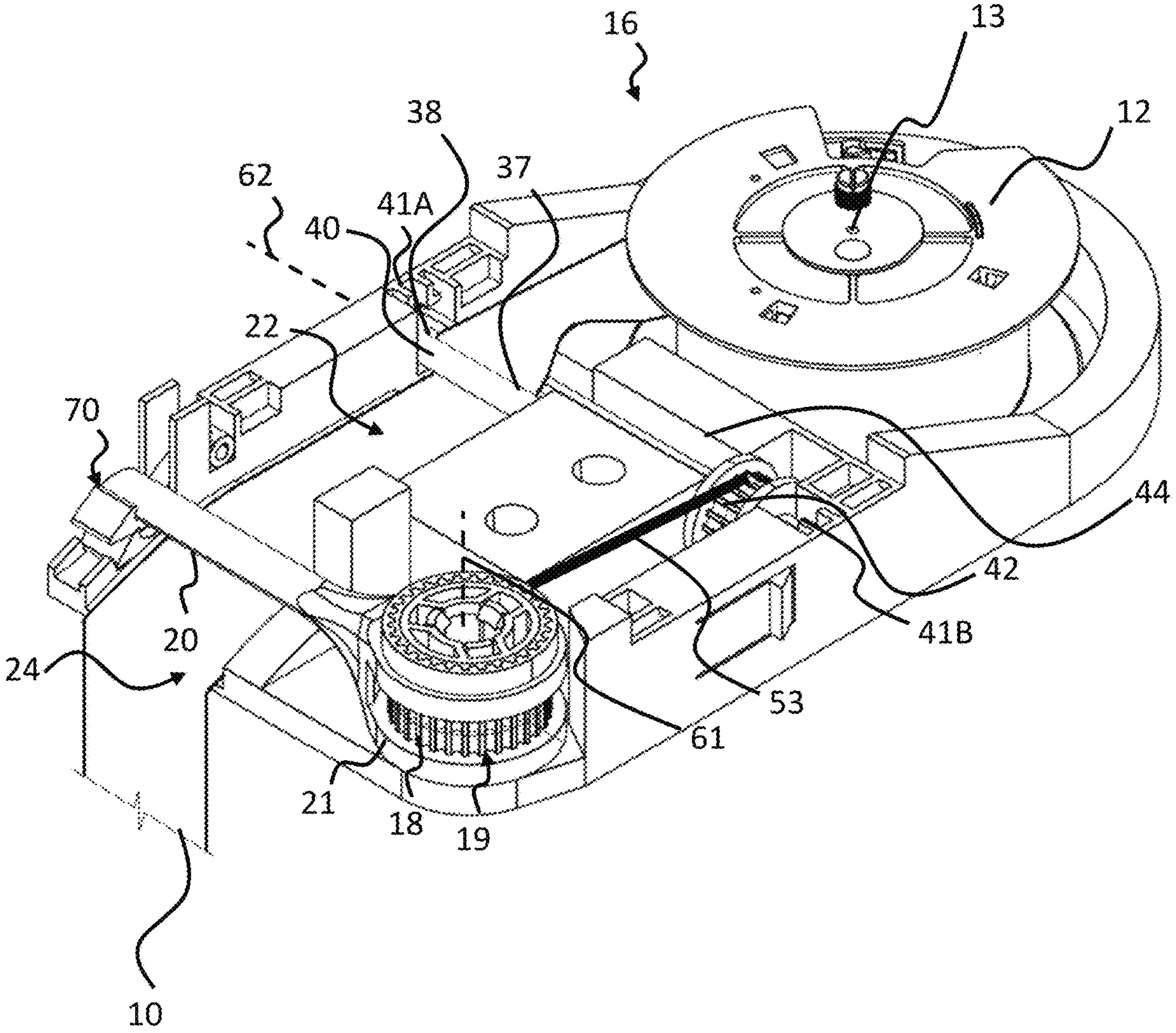
FIG. 3 is a perspective view of the winding assembly of FIG. 2, after tensioning the strap.

Each tensioning line 10 has a distal end to which an anchor 14 is attached. An anchor 14 can comprise a hook, loop or any other suitable attacher. In the extended condition of the tensioning lines 10, the anchors 14 can be secured to the pallet 3. As shown in FIGS. 2-3, each tensioning line 10 also has a proximal end attached to a drum 12.

When the anchors 14 are secured to the pallet 3, as shown in FIG. 1, the tensioning lines 10 can then be tensioned by the use of respective winding assemblies 16 operable on each tensioning line 10. Each winding assembly 16 is provided within the body 4.

Only two of the tensioning lines 10 are visible in FIG. 1, extending from two of the sides of the body 4. The skilled person will realise that the other two tensioning lines 10 extend from the other two sides. Each tensioning line 10 may have its own winding assembly 16.

FIGS. 2-3 illustrate an example winding assembly 16. The winding assembly 16 may comprise a plastic moulding securable to a winding assembly aperture in an upstanding side 5 of the body 4 of the lid 1, for example. Alternatively, the winding assembly 16 may be integrally moulded with the body 4 of the lid 1.

The winding assembly 16 comprises a drum axle 13 configured to receive the drum 12 from which the tensioning line 10 can be unwound when in use, and to which the tensioning line 10 can be re-wound when not in use.

The drum axle 13 may comprise an urger (hidden from view), such as a spring connected at one end to the drum axle 13 and at the other end to the drum 12. The urger rotatably biases the drum 12 in a winding direction to wind the tensioning line 10 on the drum 12, to move the tensioning line 10 to its retracted condition. For example, the urger may comprise a spiral spring.

The tensioning line 10 extends away from the drum 12 along a tensioning line channel 22 and through a tensioning line opening 24 in the lateral exterior of the winding assembly 16. The tensioning line channel 22 interconnects a drum cavity/the drum 12 with the tensioning line opening 24. The anchor 14 of the tensioning line 10 may be oversized relative to the tensioning line opening 24 so that the distal end of the tensioning line 10 can be easily retrieved and is not 'swallowed' by the winding assembly 16.

Each winding assembly 16 comprises a tensioner 37 in the form of a slotted spindle 40. The tensioner 37 is actuated to pull the tensioning line 10 once the anchor 14 of the tensioning line 10 has been secured to the pallet 3.

The tensioner 37 is rotatably mounted in the winding assembly 16. The tensioner 37 spans across the tensioning line channel 22 and engages with the tensioning line 10.

The illustrated tensioner 37 is rotatable about a lateral, tensioner axis of rotation 62 perpendicular to the vertical axis of rotation of the drum 12. This ensures that the winding assembly 16 is low-height.

In FIGS. 2-3, the tensioner 37 is rotatable by operation of a mesh drive linkage actuated by an interface (operating member) in the form of a lever 19. The illustrated lever 19 comprises a fulcrum body 21 and an elongate handle 20 extending from the fulcrum body 21, which a user can turn.

The lever 19 is operated by being pivotally moved about an input axis of rotation 61 from a rest position (FIG. 2) to the end of its stroke length (FIG. 3). The input axis of rotation 61 may be an upwards axis such as a vertical axis. Therefore, the lever 19 may move laterally. This ensures that the winding assembly 16 is low-height.

The illustrated tensioner 37 has a slotted spindle 40 defining a slot 38 through which the tensioning line 10 passes. The tensioner 37 is rotatably held in the winding assembly 16 by bearings 41A, 41B. By rotating the slotted spindle 40 after the tensioning line 10 has been anchored to the pallet 3, the tensioning line 10 is wound around the slotted spindle 40 which pulls any slack in the tensioning line 10 to tension the tensioning line 10.

The movement of the lever 19 from the rest position of the lever 19 to the end of the stroke length of the lever 19 rotates the slotted spindle 40 from a home position of the slotted spindle 40 to a tensioning position of the slotted spindle 40. This wraps the tensioning line 10 around the slotted spindle 40 to tension the anchored tensioning line 10. Only one stroke of the lever 19 is necessary.

When the slotted spindle 40 is at the home position, its slot 38 may be aligned with the direction in which the tensioning line 10 can be wound and unwound, to not resist pulling of the tensioning line 10 therethrough. The slot 38 may be parallel to the tensioning line channel 22. The slot 38 may face the tensioning line opening 24.

When the slotted spindle 40 is at the tensioning position, as shown in FIG. 3, the tensioning line 10 is sufficiently wound around the slotted spindle 40 to tension the tensioning line 10 and frictionally react against further unwinding of the tensioning line 10.

The angular distance from the home position of the slotted spindle 40 to the tensioning position of the slotted spindle 40 may be a reflex angle. The lever 19 may have a stroke length of approximately 180 degrees (or a different, obtuse angle).

Only one stroke of the lever 19 (e.g., 180 degrees) is necessary to rotate the slotted spindle 40 by the reflex angle (e.g., 300 degrees). The mesh drive linkage has the necessary gear ratio to effect this single-stroke operation.

It would be appreciated that a tensioner 37 could be implemented in another manner than via a slotted spindle. For example, the tensioner could comprise an over-centre cam (not shown), rotatable to compress the webbing of a strap 10 against a reaction surface, such as a base of the tensioning line channel 22. As the nose of the cam approaches perpendicular to the reaction surface, the normal compressive force of the tensioning line 10 increases to create sufficient traction to drag the tensioning line 10 back in a tensioning direction. Once the nose of the cam has passed over-centre (nose passes perpendicular), the tensioning line 10 is tensioned. Further it is difficult to unwind the tensioning line 10 by pulling on the tensioning line 10 because pulling hard increases the friction.

For manufacturing optimisation, the tensioner 37 may be a drop-in part that is dropped into a tensioner-receiving channel 44 (a cavity in the winding assembly 16) during manufacture, to rest on the bearings 41A, 41B. A top housing part (not shown) may then be secured to the winding assembly 16 to enclose the tensioner 37 therein.

In FIGS. 2-3, a mesh drive linkage couples the lever 19 to the tensioner 37. The mesh drive linkage comprises the following components: a driver sprocket 18 actuatable by the lever 19; a tensioner drive input sprocket 42; and a mesh drive loop 53 connecting the sprockets. The mesh drive loop 53 is illustrated schematically by the thick black line, and may be a transverse-ribbed belt or chain that meshes with the sprockets 18, 42.

The driver sprocket 18 may be an integral part of the fulcrum body 21 of the lever 19. For example, the lever 19 may be comprised of an elongate handle 20 connected to a sprocket 18, defining a Class 2 lever. The mechanical advantage of the lever 19 is the radius of the distal end of the elongate handle 20 from the input axis of rotation 61, divided by the shorter radius of the driver sprocket 18 from the input axis of rotation 61.

The tensioner drive input sprocket 42 is coaxial with and connected to the slotted spindle 40. The tensioner drive input sprocket 42 may be integrally moulded with, or secured to, the slotted spindle 40. The tensioner drive input sprocket 42 can therefore rotate about the same bearings 41A, 41B as the tensioner 37.

The tensioner axis of rotation 62 of the tensioner drive input sprocket 42 is perpendicular to the input axis of rotation 61 about which the driver sprocket 18 rotates. Therefore, the drive loop 53 can comprise a quarter-twist to connect the axes.

Returning to FIGS. 2-3, the winding assembly 16 is provided with a handle retainer 70 configured to engage with the elongate handle 20 of the lever 19 following actuation of the lever 19 in a first, tensioning direction (from the rest position of the lever 19 to the end of the stroke length of the lever 19), to prevent movement of the elongate handle 20 of the lever 19 in a second, opposite direction despite the bias force from the urging member of the drum axle 13 biasing the lever 19 back towards its rest position.

FIG. 2 shows the lever 19 at its rest position wherein the tensioner 37 is at its home position. FIG. 3 shows the lever 19 at its full stroke position wherein the tensioner 37 is at its tensioning position. In FIG. 3, the elongate handle 20 of the lever 19 is engaged with the handle retainer 70.

Figure 4A:
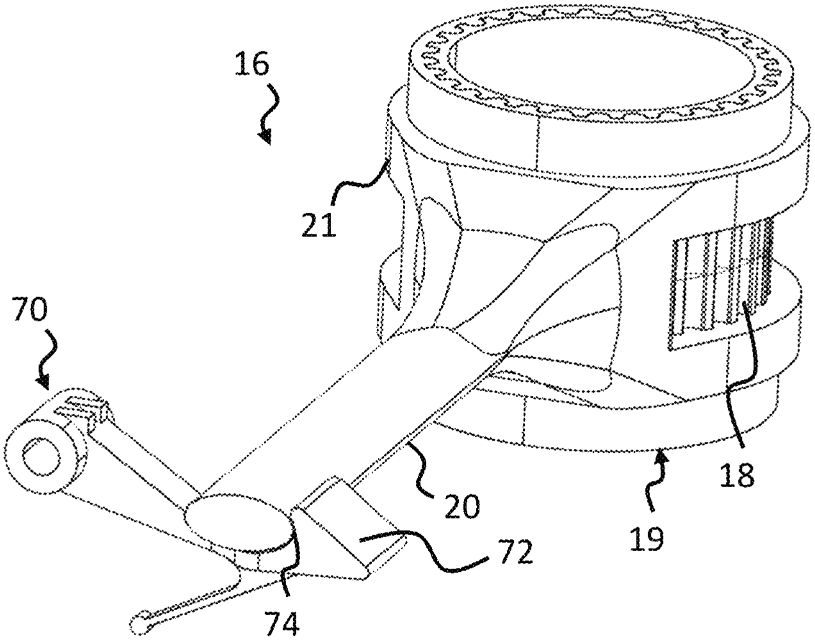
FIG. 4A is a detail view of a handle retainer engaging an elongate handle of a lever and FIG. 4B is a detail view of the handle retainer releasing the elongate handle.
Figure 4B:
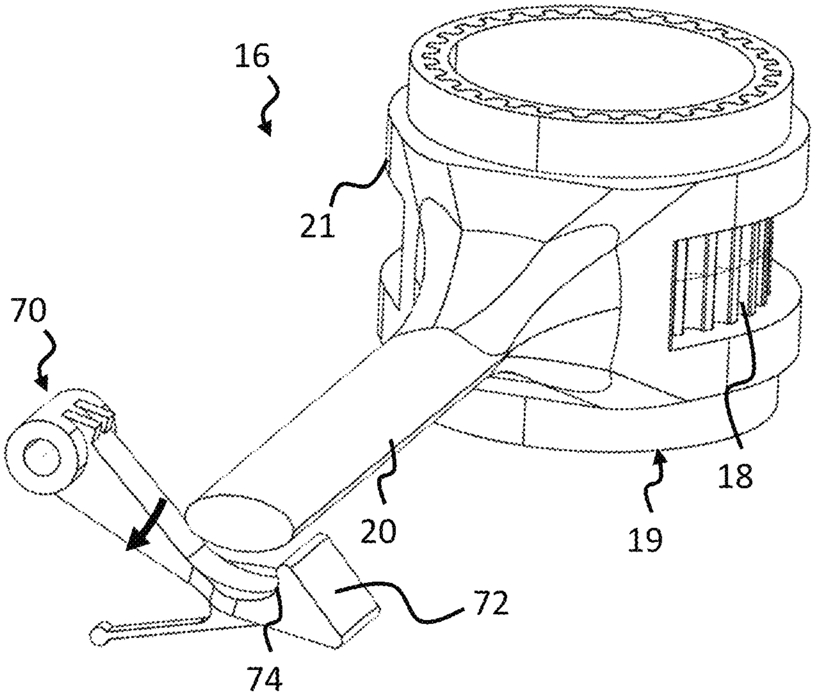

FIGS. 4A-4B show the handle retainer 70 in more detail. The handle retainer 70 comprises a catch 72 configured to automatically (i.e., without user intervention) engage and hold the elongate handle 20 of the lever 19 when the elongate handle 20 of the lever 19 is moved into the catch 72 (the full stroke position of the lever 19).

The catch 72 operates in the manner of a one-way gate that the lever 19 can enter but cannot leave without first undoing the catch 72. The catch 72 is implemented as a snap-fit catch 72.

The snap-fit catch 72 is in the path of the elongate handle 20. The elongate handle 20 pushes against the snap-fit catch 72 to deflect the snap-fit catch 72 away from its neutral undeflected position, for example by flexing the snap-fit catch 72. The axis of flex/rotation of the snap-fit catch 72 may be a lateral axis. When the elongate handle 20 passes an over-centre detent 74 of the snap-fit catch 72, the snap-fit catch 72 toggles into engagement with the elongate handle 20. The whole elongate handle 20 may be within the detent 74. The detent 74 is hook-shaped to create the over-centre actuation.

The elongate handle 20 is itself shaped to deflect the snap-fit catch 72 until the portion of the elongate handle 20 settles into the detent 74. As shown, the elongate handle 20 comprises a curved surface to deflect the snap-fit catch 72. Alternatively, the surface could be sloped and ramp-like. Likewise, the snap-fit catch 72 comprises a sloped and/or curved deflection surface for deflection by the elongate handle 20. The shape of the detent 74 of the snap-fit catch 72 may also match a portion of the cross-section shape of the elongate handle 20 (e.g., oval shaped in the FIGs).

As shown in FIGS. 2-3, the handle retainer 70, the elongate handle 20 and the tensioning line opening 24 are exterior parts of the winding assembly 16. They are at an upstanding side 5 of the lid 1 of FIG. 1. Therefore, a user can grab the elongate handle 20, turn the lever 19 and see how the elongate handle 20 is engaged. The engagement of the elongate handle 20 into the handle retainer 70 provides clear feedback that the tensioning line 10 is now sufficiently tensioned.

As shown in FIGS. 2-3, the handle retainer 70 is aligned with a distal end portion of the elongate handle 20, distal from the fulcrum body 21 of the lever 19. The term 'distal end portion' refers to alignment with the end or to the final third, quarter or fifth of the length of the elongate handle 20 (length not including the radius of the fulcrum body 21).

To release the elongate handle 20 from the handle retainer 70, the user pushes (e.g., flexes) the catch 72 vertically with their finger, to separate the detent 74 from the elongate handle 20. The deflection surface of the catch 72 may function as the handle releaser by being sized to receive a user's fingertip.

This disengagement of the handle retainer 70 is sufficient to allow the urger of the drum axle 13 to pull the line 14 hard enough to rotate the tensioner 37 back to its home position, the back-rotation of the tensioner 37 causing rotation of the lever 19 back to its rest position. The tensioning line 10 is now slack which allows the user to separate the anchor 14 from the pallet 3 and retract the tensioning line 10.

It would be appreciated that a different type of handle retainer and/or handle releaser could be implemented than that shown, such as a manually operated latch arrangement.

Figure 5A:
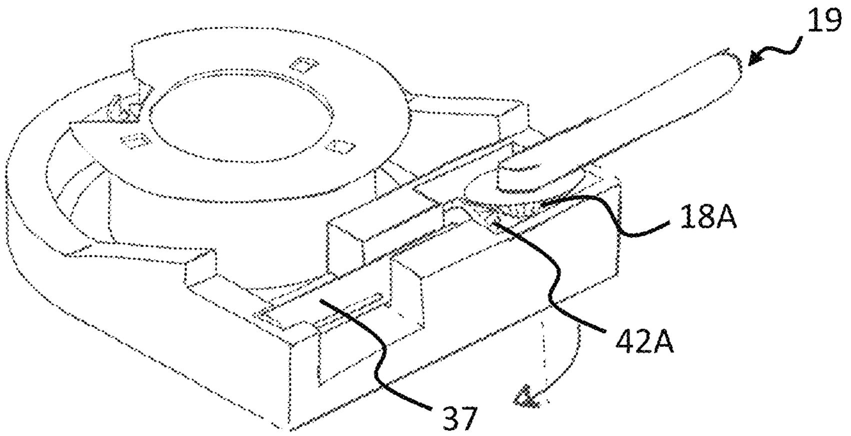
FIG. 5A is a detail view of a bevel gear drive linkage and FIG. 5B is a detail view of a worm gear drive linkage.
Figure 5B:
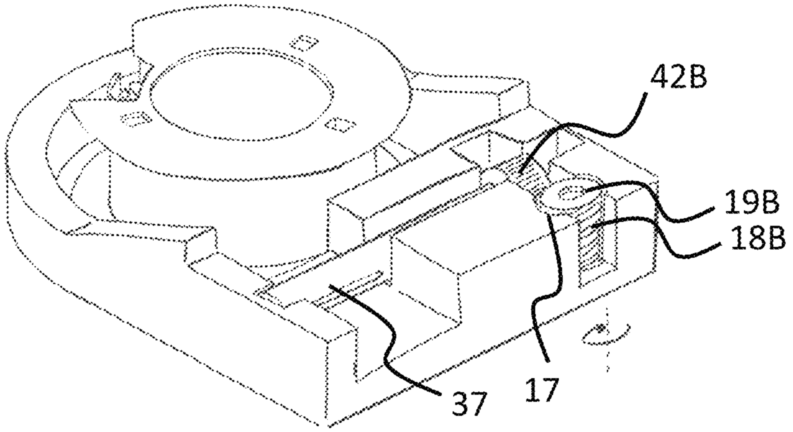

The mesh drive linkage can also be varied. FIGS. 5A-5B illustrate example alternative implementations of a mesh drive linkage connecting different axes. Instead of a sprocket and a loop, the driver is a gear and the tensioner drive input is a gear. The driver gear meshes directly or indirectly with the tensioner drive input gear. In FIG. 5A, the driver gear is a bevel gear 18A and the tensioner drive input gear is a bevel gear 42A. In FIG. 5B, the driver gear is a worm drive 18B and the tensioner drive input gear is a worm wheel 42B.

FIG. 5B differs from FIGS. 2-5A in that the interface for receiving actuation force is a recess 19B configured to receive a drive key of a tool (not shown). The illustrated recess 19B is a polygonal recess in a top end face of the worm drive 18B. The illustrated worm drive 18B is upstanding (rotatable about an upright/vertical axis), with tool access from the upper portion 7 of the lid 1. Alternatively, the worm drive 18B may be mounted laterally (rotatable about a lateral/horizontal axis), with tool access from an upstanding side 5 of the lid 1. The polygonal recess 19B is for receiving a polygonal drive key having a polygonal end profile. The tool may be an electric tool capable of rotating the drive key. The illustrated polygonal recess 19B is a hexagonal recess. Alternatively, the polygonal recess 19B can be another suitable shape, such as star-shaped. The drive key may be a hex drive key, a star shaped drive key, or any other suitable drive key.

The mesh drive linkage may provide an interface: tensioner gear ratio of greater than 5:1 or greater than 10:1 or greater than 15:1. In an example implementation, eighteen turns of the interface turns the tensioner 37 by the required reflex angle from the home position to the tensioning position.

Figure 6A:
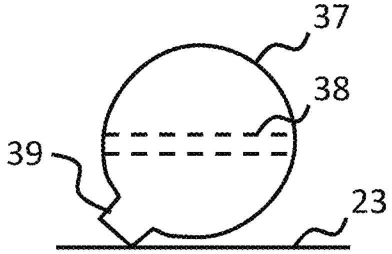
FIG. 6A is a schematic cross-section view of a tensioner with an end stop.
Figure 6B:
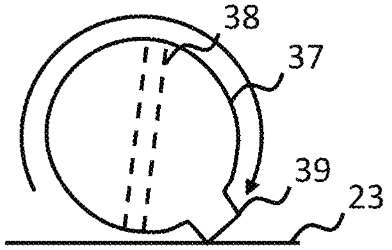
FIG. 6B is the tensioner with an end stop at an abutting position.

In order to prevent over-tensioning of the tensioning line 10 by the tool, FIGS. 6A-6B illustrate an example end stop 39 for preventing movement of the tensioner 37 beyond its tensioning position. The illustrated end stop 39 is a rotation-limiting protrusion configured to collide with a static part of the winding assembly 16 when the tensioner 37 is at its tensioning position. The end stop 39 may collide with the base 23 of the tensioning line channel 22. It would be appreciated that the illustrated end stop 39 is one of several possible implementations of an end stop.

Although only FIG. 5B shows a recess 19B, it would be appreciated that a recess could be provided to the bevel gear 18A in the example of FIG. 5A, or to the driver sprocket 18 in the example of FIGS. 2-4B. The lever 19 could be omitted or detachable.

The parts 18, 42 (or 18A, 42A or 18B, 42B) of the mesh drive linkage may be injection moulded plastics parts. In an example implementation, the driver is a moulded worm drive 18B with a moulded recess 19B.

For manufacturing optimisation, the parts 18, 42 (or 18A, 42A or 18B, 42B) of the mesh drive linkage may be drop-in parts. The driver 18, 18A, 18B may be a drop-in part. For example, in FIG. 5B, the winding assembly 16 comprises a cylindrical recess 17 into which the worm driver 18B can be lowered. The tensioner drive input 42, 42A, 42B may be a drop-in part by virtue of being attached to or integral with the drop-in tensioner 37. The parts may then be enclosed by the above-mentioned top housing part or by a second top housing part.

Figure 7:
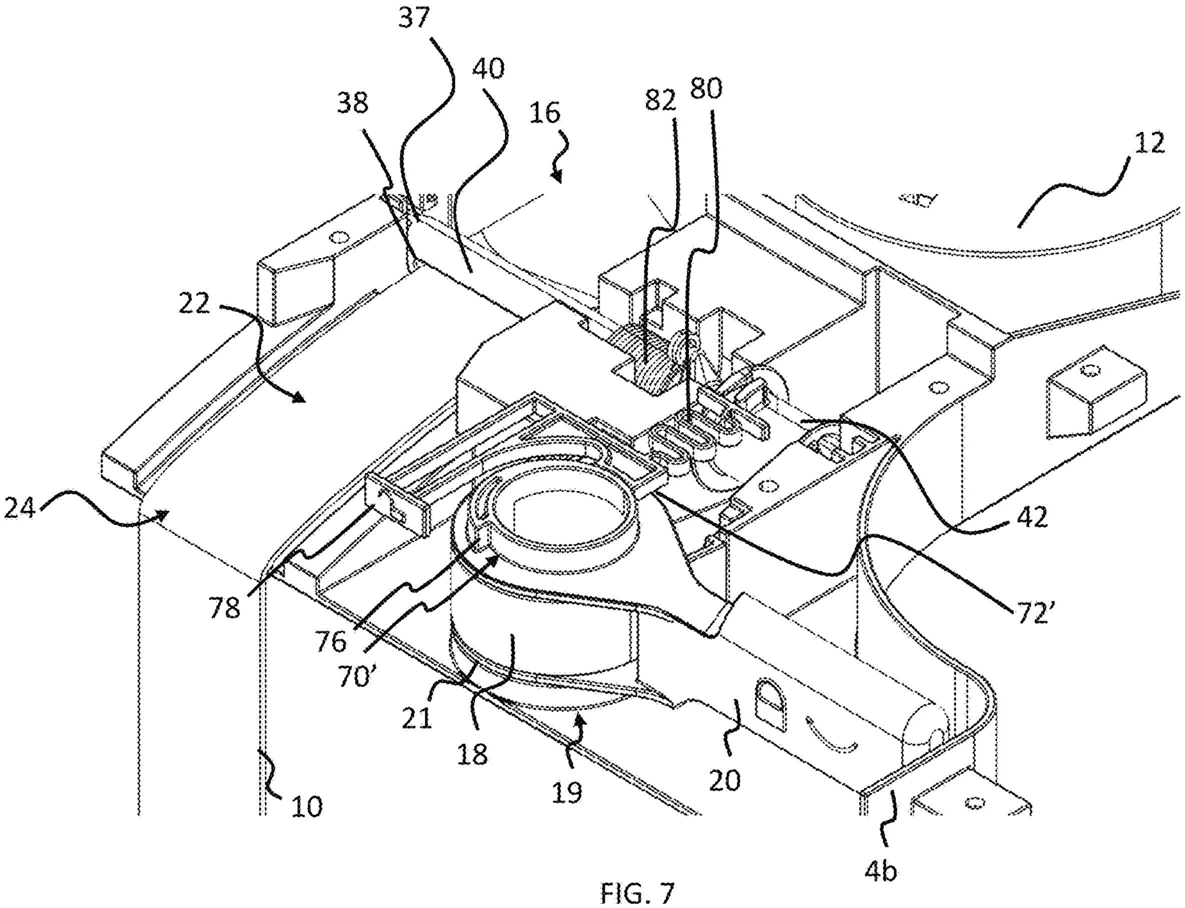
FIG. 7 is a perspective view of an alternative winding assembly for use in the lid shown in FIG. 1, before a strap is tensioned.
Figure 8:
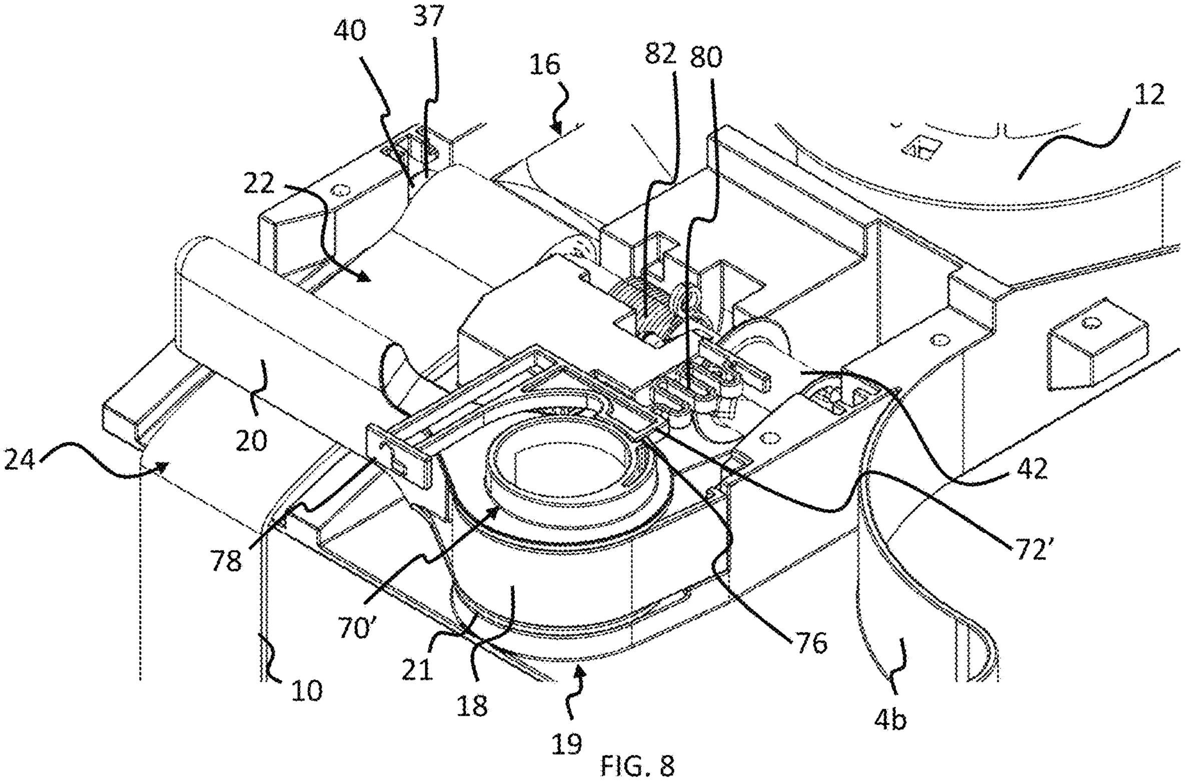
FIG. 8 is a perspective view of the winding assembly of FIG. 7, after tensioning the strap.

FIGS. 7-8 show an alternative design of retainer 70', compared to the handle retainer 70 of FIGS. 2-4B. Relative to the handle retainer 70 of FIGS. 2-4B, the retainer 70' engages a downstream part of the drive linkage connecting the handle to the tensioner. This downstream retainer 70' is at least partially hidden/internal rather than being exposed.

The retainer 70' of FIGS. 7-8 comprises a single-drop spiral cam 76 comprised in the fulcrum body 21 of the lever 19, and a spring-loaded catch 72' configured to engage with the spiral cam 76. The axis of the spiral cam 76 may be coaxial with the lever axis of rotation 61. The illustrated spiral cam 76 is above the driver 18, but could alternatively be below the driver 18.

The retainer 70' is configured to engage with the lever 19 following actuation of the lever 19 in the first, tensioning direction (from the rest position of the lever 19 to the end of the stroke length of the lever 19), to prevent movement of the lever 19 in the second, opposite direction despite the bias force from the urger of the drum axle 13 biasing the lever 19 back towards its rest position.

FIG. 7 shows the lever 19 at its rest position wherein the tensioner 37 is at its home position. As the lever 19 is rotated to the full stroke position shown in FIG. 7, the rotating spiral cam 76 deflects the catch 72', acting against the spring 80 of the catch 72'. FIG. 7 shows the lever 19 at its full stroke position wherein the tensioner 37 is at its tensioning position. In FIG. 7, the retainer 70' is in an engaged state. Specifically, the catch 72' has fallen into the drop of the spiral cam 76. Therefore, when the user releases the handle 20, the lever 19 remains stationary because the spiral cam 76 is unable to back-rotate due to the engagement between the catch 72' and the drop of the spiral cam 76.

The catch 72' operates in the manner of a one-way gate that the spiral cam 76 can enter but cannot leave without first undoing the catch 72'. The catch 72' is implemented as a spring-loaded catch 72'.

As shown in FIGS. 7-8, the elongate handle 20 and the tensioning line opening 24 are exterior parts of the winding assembly 16. They are at an upstanding side 5 of the lid 1 of FIG. 1. Therefore, a user can grab the elongate handle 20, turn the lever 19 and feel the elongate handle 20 being engaged by the retainer 70'. The engagement of the retainer 70' provides clear haptic feedback that the tensioning line 10 is now sufficiently tensioned.

To release the elongate handle 20 from the retainer 70', the user pushes a releaser in the form of a release button 78 with their finger, to separate the catch 72' from the drop of the spiral cam 76. The release button 78 is sized to receive a user's fingertip.

This disengagement of the retainer 70' by the release button 78 may or may not be sufficient to allow the urger of the drum axle 13 to pull the line 10 hard enough to rotate the tensioner 37 back to its home position. Should the urger of the drum axle 13 not be powerful or consistent enough to cause rotation of the tensioner 37 to its home position, a return spring 82 can be provided. FIGS. 7-8 illustrate an example return spring 82, described below.

One end of the illustrated return spring 82 is connected to the slotted spindle 40 and another end of the return spring 82 is attached to the housing of the winding assembly 16. The return spring 82 is wrapped around the slotted spindle 40. The return spring 82 is configured to bias the tensioner 37 back to its home position upon actuation of the release button 78.

If the handle 20 is connected to the slotted spindle 40 via a non-slip drive linkage, then the return spring 82 is able to simultaneously bias the tensioner 37 back to its home position and the lever 19 to its rest position. Otherwise, a separate return spring may be provided for the lever 19 at the cost of an increased part count.

In other implementations, the return spring 82 could be connected to another part of the tensioner load path connecting the handle 20 to the rotation of the slotted spindle 40.

In some examples, a return spring 82 of the type described in relation to FIGS. 7 and 8 could be employed in the winding assembly 16 of FIGS. 2 to 4B.

The tensioning line 10 is now slack which allows the user to separate the anchor 14 from the pallet 3 and retract the tensioning line 10.

The release button 78, the catch 72', and optionally the spring 80, may be an integral part such as an integrally-moulded part. This obviates the need for a mechanism connecting the release button 78 to the catch 72', or multiple parts during manufacture.

For intuitive use, the release button 78 is an exterior part of the winding assembly. The release button 78 is adjacent the lever 19. The release button 78 is exposed at the upstanding side 5 of the lid 1 of FIG. 1. The spring 80 may be internal and anchored against a part of the lid 1 of FIG. 1.

Since the part comprising the release button 78 is a high-wear item, it can be mounted above the driver 18 for ease of replacement. When a top cap (not shown) of the housing 4*b* is removed, the part is located at the top of the winding assembly 16 and can therefore be picked out for replacement. This minimises the down-time of a damaged winding assembly 16, and promotes repair rather than replacement.

Figure 9:
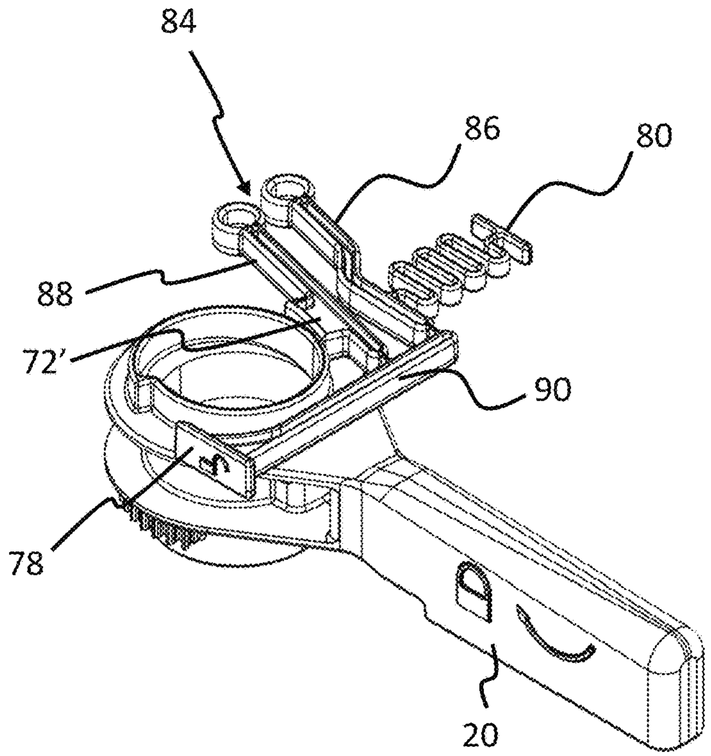
FIG. 9 illustrates an alternative winding assembly.

FIG. 9 illustrates a variant of the part comprising the release button 78, wherein motion of the release button 78 is controlled by a multi-link mechanism 84.

In the illustrated example, the multi-link mechanism 84 is in the form of a parallel four-link mechanism 84, to linearise a motion of the release button 78 and keep the release button 78 facing a given direction between non-depressed and depressed positions of the release button 78.

The multi-link mechanism 84 comprises a crank 86, a rocker 88, and a connecting rod 90 supported by the crank 86 and rocker 88, wherein the release button 78 is supported by the connecting rod 90.

The crank 86 and rocker 88 may be pivotally connected to the housing 4*b* (not shown), for example to the top cap. Where the multi-link mechanism 84 is a four-link mechanism, the housing 4*b* would represent the fourth link in a free body diagram.

A first end of the crank 86 is pivotally supported by the housing 4*b*. A second end of the crank 86 pivotally supports the connecting rod 90. The connecting rod 90 may be pivotally supported by the crank 86 by a flexure bearing such as a living hinge.

The spring 80 may be connected to any appropriate location on the multi-link mechanism 84 to urge the release button 78 to its non-depressed position. For example, the spring 80 is shown as being connected to the crank 86.

A first end of the rocker 88 is pivotally supported by the housing 4*b*. A second end of the rocker 88 pivotally supports the connecting rod 90. The connecting rod 90 may be pivotally supported by the rocker 88 by a flexure bearing such as a living hinge.

The catch 72' may be located anywhere on the multi-link mechanism 84 that is aligned with the spiral cam 76 and which enables the spring 80 to urge the catch 72' towards the spiral cam 76. For example, the catch 72' is shown as being formed along the rocker 88.

A first end of the connecting rod 90 may be connected to the crank 86. A second end of the connecting rod 90 may support the release button 78. The rocker 88 may be connected between the first and second ends of the connecting rod 90. The second end of the connecting rod 90 may be cantilevered beyond the rocker 88.

The multi-link mechanism 84 may be movable in a horizontal plane. Therefore, additional height is not required to accommodate the multi-link mechanism 84.

As the handle 20 is turned from the rest position to its full stroke position, the spiral cam 76 slides against the catch 72' to rotate the multi-link mechanism 84 in a first direction resisted by the spring 80. When the full stroke position is reached, the spring 80 is able to actuate the multi-link mechanism in a second, opposite direction to engage the catch 72' with the drop of the spiral cam 76.

When the release button 78 is depressed by a user's digit while the handle 20 is at the full stroke position, the connecting rod 90 rotates the rocker 88 and the crank 86 in the first direction resisted by the spring 80. With sufficient depression of the release button 78, the catch 72' is lifted out of the spiral cam 76, enabling the handle 20 to spring back to its rest position.

When the user's digit is then removed from the release button 78, the spring 80 rotates the crank 86 in the second direction to actuate the multi-link mechanism 84 to return the release button 78 to its non-depressed position, and urge the catch 72' against the spiral cam 76. The multi-link mechanism 84 may be an integrally-formed part. The multi-link mechanism 84 may be integrally formed with the release button 76, catch 72', and spring 80.

Figure 10:
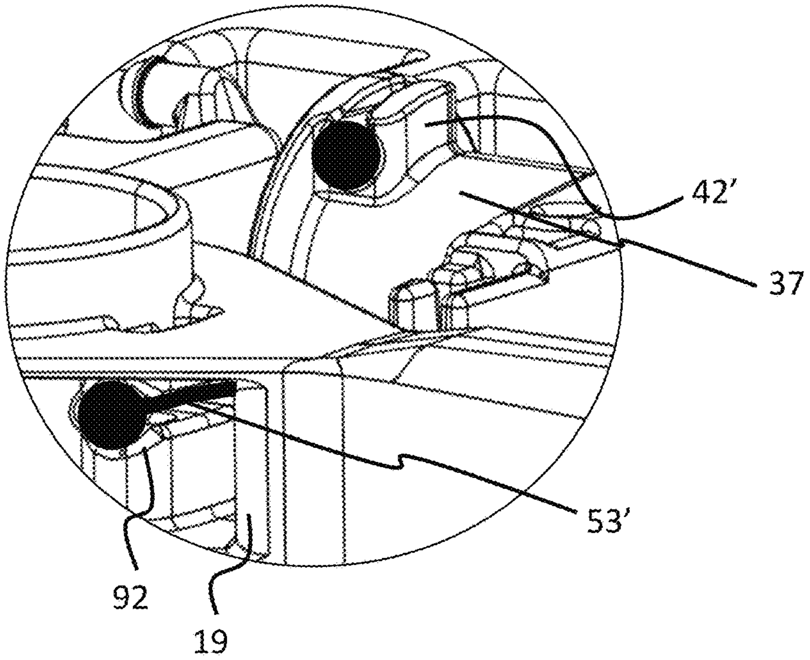
FIG. 10 illustrates a cable actuator.

FIG. 10 illustrates an example cable actuator for non-slip operation. As shown in the detail view of FIG. 10, a transmission line 53' is provided in the form of a cable. The cable is connected at one end to a first seat 92 mounted to the lever 19, and connected at its opposite end to a tensioner drive input 42' of the tensioner 37, the input 42' being in the form of a second seat. The seats 42', 92 and cable 53' define a winding mechanism. It would be appreciated that a different form of connection could be provided, in other examples.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A winding assembly comprising:

a tensioner to which a tensioning line is engageable;

an interface configured to receive actuation force;

a drive linkage coupling the actuation of the interface to motion of the tensioner, wherein the drive linkage is a mesh drive linkage, wherein the mesh drive linkage comprises a lever-actuatable driver, wherein the tensioner comprises a tensioner drive input directly or indirectly coupled to the lever-actuatable driver via meshing, and actuated by the lever-actuatable driver, wherein at least one of the lever-actuatable driver or the tensioner drive input is a sprocket or a gear, wherein the lever-actuatable driver is a first gear and the tensioner drive input is a second gear, wherein at least one of the first or the second gear is movable out of meshing with the other to release the tensioner; and a tactile user control connected to a mechanism to cause the de-meshing between the first gear and the second gear.

2. The winding assembly of claim 1, wherein an angular distance from a home position of the tensioner to a tensioning position of the tensioner is a reflex angle.

3. The winding assembly of claim 1, wherein the interface is rotatable about an input axis of rotation extending through a fulcrum body, and wherein the input axis of rotation is an upwards axis.

4. The winding assembly of claim 3, wherein the tensioner is rotatable about a tensioner axis of rotation different from the input axis of rotation.

5. A winding assembly comprising:

a tensioner to which a tensioning line is engageable;

an interface configured to receive actuation force, wherein the interface comprises a lever, wherein the lever has a stroke length associated therewith, wherein actuation of the lever by a single stroke length in a tensioning direction actuates the tensioner from a home position of the tensioner to a tensioning position of the tensioner in which the tensioning line is tensioned, wherein an angular distance from the home position of the tensioner to the tensioning position of the tensioner is a greater angle than an angular distance of the single stroke length of the lever, wherein the angular distance from the home position of the tensioner to the tensioning position of the tensioner corresponding to the single stroke length of the lever is a reflex angle; and a drive linkage coupling actuation of the interface to motion of the tensioner, wherein the drive linkage is a winding mechanism.

6. The winding assembly of claim 5, wherein the drive linkage comprises a lever-actuatable driver.

7. The winding assembly of claim 5, wherein the tensioner comprises a tensioner drive input coupled to the lever-actuatable driver by a transmission line.

8. The winding assembly of claim 5, wherein the interface is rotatable about an input axis of rotation extending through a fulcrum body.

9. The winding assembly of claim 8, wherein the tensioner is rotatable about a tensioner axis of rotation different from the input axis of rotation.

10. The winding assembly of claim 5, wherein the lever comprises a fulcrum body and an elongate handle extending from the fulcrum body.

11. The winding assembly of claim 5, wherein the lever is a hand-lever.

12. The winding assembly of claim 5, wherein the tensioner is configured to receive the tensioning line therethrough.

13. The winding assembly of claim 12, wherein the tensioner comprises a slotted spindle, slotted to receive the tensioning line therethrough.

14. The winding assembly of claim 5, wherein the tensioning line comprises a strap.

15. The winding assembly of claim 5, comprising a drum axle configured to receive a drum from which the tensioning line can be unwound and to which the tensioning line can be wound.

16. The winding assembly of claim 15, wherein the drum fitted to the drum axle is biased in a winding direction.

17. A pallet lid comprising the winding assembly as claimed in claim 5.

* * * * *